J. H. MIXER.
VALVE SEAT.
APPLICATION FILED JUNE 20, 1912.
1,074,191.
Patented Sept. 30, 1913.
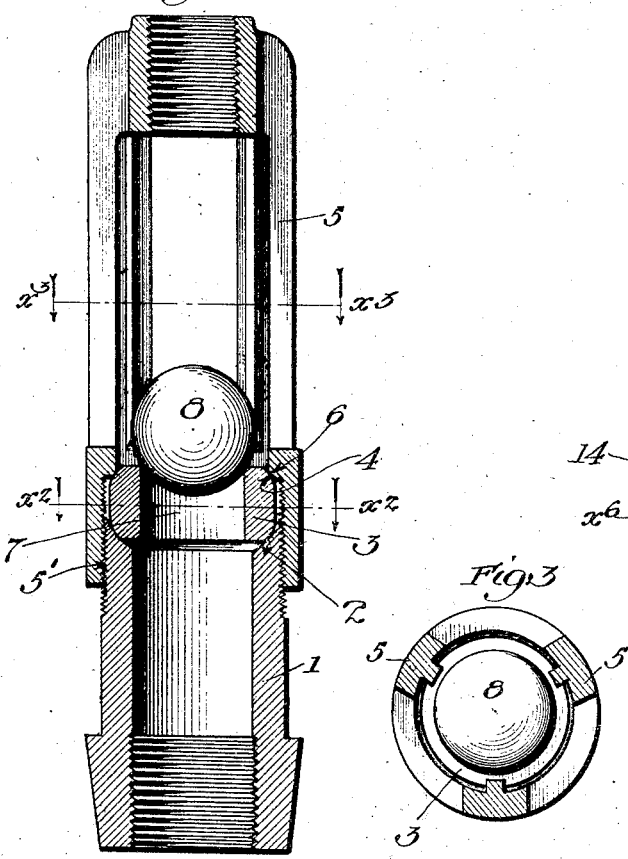
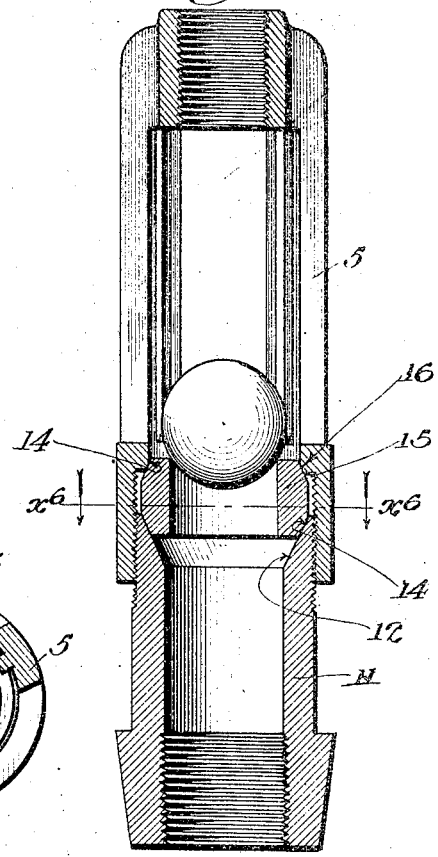
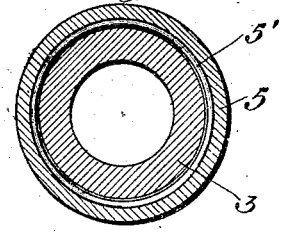
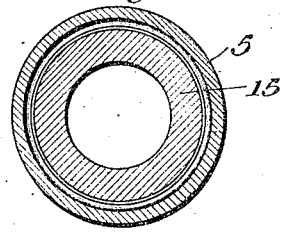
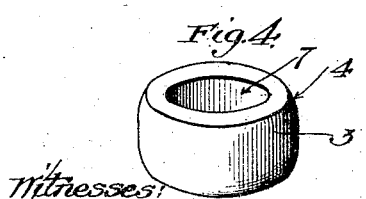
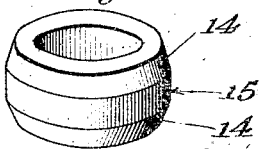
Inventor
John Henry Mixer.
by Lyon & Hackley attys

UNITED STATES PATENT OFFICE.

JOHN HENRY MIXER, OF SHALE, CALIFORNIA.

VALVE-SEAT.

1,074,191.

Specification of Letters Patent. Patented Sept. 30, 1913.

Application filed June 20, 1912. Serial No. 704,930.

*To all whom it may concern:*

Be it known that I, JOHN HENRY MIXER, a citizen of the United States, residing at Shale, in the county of Kern and State of California, have invented new and useful Improvements in Valve-Seats, of which the following is a specification.

This invention relates to valve seats particularly intended for standing valves of oil well pumps or other standing valves, where the fluid is pumped under heavy pressure and is liable to cut the valve seat by reason of such pressure or by reason of grit or corroding agent contained in the fluid pumps. Standing valves for well pumps are made with a removable valve seat ring which is clamped in position on a tubular valve body, and in practice it is not possible to make this movable valve seat ring fit its bearing on the valve body with sufficient accuracy and tightness to prevent leakage of fluid with the result that eventually the valve seat ring and body become cut or worn by fluid squeezing through between them, carrying gas or particles of grit and gradually cutting away the metal.

The main object of the present invention is to provide a valve seat ring which will seat itself so accurately and tightly on the valve body that it is not possible for fluid to pass between them so that there is no wear due to leakage under the seat ring.

Other objects of the invention will appear hereinafter.

The accompanying drawings illustrate embodiments of my invention, and referring thereto:

Figure 1 is a vertical section of a valve seat, showing one form of the valve ring. Fig. 2 is a section on line $x^2-x^2$ in Fig. 1. Fig. 3 is a section on line $x^3-x^3$ in Fig. 1. Fig. 4 is a perspective view of the valve seat ring. Fig. 5 is a vertical section showing another form of the invention. Fig. 6 is a section on line $x^6-x^6$ in Fig. 5. Fig 7 is a perspective view of the form of valve seat ring shown in Figs. 5 and 6.

The lower member or body 1 of the valve may be of any usual or suitable construction, being tubular in shape and being provided with the usual means for securing it in place in the working barrel. The upper end of this tubular valve body is formed with an upwardly flaring curved face or seat 2 which may, as shown in Fig. 1, be concavely curved to fit a correspondingly formed valve seat ring.

The valve seat ring 3 is tapered on its peripheral face at each end, so as to seat on and make tight contact with the flaring face 2 of the valve body 1, the tapering portions 4 of the valve seat ring being preferably convex to conform to the concavity of the flaring face 2. The valve seat ring 3 is held in position on the flaring face 2 by any suitable clamping means, for example, the cage 5, said cage being provided with a shoulder 6 adapted to engage the upper tapered face 4 of the valve seat ring, said shoulder being preferably tapered to fit the flaring face of the ring. The cage 5 screws on the valve body, said cage and body being screw threaded in the usual manner as shown at 5'. The two tapering faces 4 of the valve seat ring being identical in form, the said ring is invertible so that either end may be placed on the flaring face 2 and will fit tightly therein when forced down by the clamping means. The upper edge of the bore 7 of the valve seat ring forms a seat for the valve closure means, consisting of the valve ball 8.

In assembling the valve, the valve seat ring 3 is placed on the flaring face 2 of the valve body 1 and the cage 5 with the ball 8 therein is screwed on the valve body 1 until its shoulder 6 engages the upper tapering face of the valve seat ring, forcing said valve seat ring into tight contact with the flaring face or seat 2 on the valve body. On account of the flaring shape of the seating faces on the valve body and valve seat ring, the valve seat ring will find a true seat so as to make a tight joint in a manner that is not possible with a flat seat, the ring accommodating itself to the seating surface 2 so as to seat with equal tightness all around. This accommodation of the valve seat ring to the seating face therefor is facilitated by the curvature of the seating faces, enabling the ring to tilt slightly as required in one direction or the other and it is further facilitated by the taper of the shoulder 6 on the cage 5. Moreover, the flare of the seating face 2 enables the valve seat ring 3 to act as a wedge in expanding the relatively thin upper end portion of the valve body, thereby insuring a tight and close fit. In order to enable the valve seat ring to accomplish this result it is necessary that the said ring should be rigid, and in fact, more rigid than the tapered portion of the valve body. This is accomplished by making the said valve seat ring out of the usual material, viz., a metal which is hard as, or harder than the material of the valve body, and making it thicker than the adjacent tapered part of the valve body as shown.

In the form shown in Figs. 5, 6 and 7, the valve body 11 is formed with a flaring beveled face 12 at its upper end to fit beveled or tapered faces 14 on a valve seat ring 15, said faces 12 and 14 being conical instead of curved as in Fig. 1. The valve cage 5 in this case bears by its shoulder 16 against the upper face 14 of the valve seat ring, so as to press the lower face of the valve seat ring tightly against the face 12. This form of the invention also provides for expansion of the upper thin portion of the valve body 1, insuring a tight fit.

What I claim is:

1. A pump valve seat comprising a tubular valve body provided with a flaring ring face, a metal valve seat ring having tapered peripheral lower and upper faces and a member having a shoulder provided with a flaring ring face binding on the valve seat ring.

2. A pump valve seat comprising a tubular valve body and provided with a flaring ring face, a metal valve seat ring having curved peripheral lower and upper faces and a member having a shoulder provided with a flaring ring face binding on the valve seat ring.

3. A valve seat for a standing valve well pump comprising a tubular valve body having means at its lower end, for securing it to a working barrel, and provided with a flaring ring face and a screw thread at its upper end, a metal valve seat ring having tapered peripheral lower and upper faces and a clamping cage having a screw thread working on the screw thread of the valve body and a shoulder provided with a flaring ring face binding on the valve seat ring.

4. A valve seat for a standing valve, well pump comprising a tubular valve body having means at its lower end for securing it to a working barrel and provided with a flaring ring face and a screw thread at its upper end, a metal valve seat ring having curved peripheral lower and upper faces and a clamping cage having a screw thread working on the screw thread of the valve body and a shoulder provided with a flaring ring face binding on the valve seat ring.

In testimony whereof, I have hereunto set my hand at Los Angeles, California, this 14th day of June, 1912.

JOHN HENRY MIXER.

In presence of—
ARTHUR P. KNIGHT,
MARTHA M. LANGE.